US008442875B1

(12) United States Patent
Cohen et al.

(10) Patent No.: US 8,442,875 B1
(45) Date of Patent: *May 14, 2013

(54) CREATING AND MAINTAINING ELECTRONIC GIFT LISTS

(75) Inventors: Jacob D. Cohen, Kirkland, WA (US); Werner G. Koepf, Bellevue, WA (US); Nasreen AbdulJaleel, Seattle, WA (US); Christopher E. Newell, Seattle, WA (US); Natalie F. Gordon, Seattle, WA (US); Matthew R. Smith, Burien, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/471,298

(22) Filed: May 14, 2012

Related U.S. Application Data

(63) Continuation of application No. 11/557,447, filed on Nov. 7, 2006, now Pat. No. 8,195,529.

(51) Int. Cl.
*G06Q 30/00* (2012.01)

(52) U.S. Cl.
USPC .................................. 705/27.1; 705/26.1

(58) Field of Classification Search .......... 705/26.1, 705/27.1
See application file for complete search history.

(56) References Cited

U.S. PATENT DOCUMENTS

| 5,663,547 A | 9/1997 | Ziarno |
| 5,721,832 A | 2/1998 | Westrope et al. |
| 5,754,981 A | 5/1998 | Veeneman et al. |
| 5,909,023 A | 6/1999 | Ono et al. |
| 5,960,411 A | 9/1999 | Hartman et al. |
| 6,026,376 A | 2/2000 | Kenney |
| 6,128,599 A | 10/2000 | Walker et al. |

(Continued)

FOREIGN PATENT DOCUMENTS

| WO | WO9923591 A1 | 5/1999 |
| WO | WO0016227 A1 | 3/2000 |

(Continued)

OTHER PUBLICATIONS

"Fred Pryor Seminars," dated Mar. 6, 2005, located at http://web.archive.org/web/20050306234345/http://www.pryor.com/faq.asp, accessed from Internet Archive on Jan. 16, 2013.*

(Continued)

*Primary Examiner* — Jeffrey A Smith
*Assistant Examiner* — Anne Georgalas
(74) *Attorney, Agent, or Firm* — Knobbe, Martens, Olson & Bear, LLP

(57) ABSTRACT

A system for maintaining gift lists for other persons is presented. The system includes a data store and a computing device. The data store stores at least information related to items available for purchase. The computing device is in communication with and has access to the data store. Moreover, the computing device is configured to create a gift list. The gift list includes references to items that are available for purchase by a user, and that are selected by a user as potential gifts for another. Additionally, access to the gift list is controlled by the user that created the gift list. The computing device is further configured in such a way as to add a reference to an item to the gift list while the user browses the items available for purchase.

19 Claims, 14 Drawing Sheets

U.S. PATENT DOCUMENTS

| | | | |
|---|---|---|---|
| 6,249,773 | B1 | 6/2001 | Allard et al. |
| 6,321,211 | B1 | 11/2001 | Dodd |
| 6,370,514 | B1 | 4/2002 | Messner |
| 6,405,178 | B1 | 6/2002 | Manchala et al. |
| 6,493,724 | B1 | 12/2002 | Cusack et al. |
| 6,519,573 | B1 | 2/2003 | Shade et al. |
| 6,587,835 | B1 * | 7/2003 | Treyz et al. ................ 705/14.64 |
| 6,598,026 | B1 | 7/2003 | Ojha et al. |
| 6,609,106 | B1 | 8/2003 | Robertson et al. |
| 6,611,814 | B1 | 8/2003 | Lee et al. |
| 6,629,079 | B1 | 9/2003 | Spiegel et al. |
| 6,633,849 | B1 | 10/2003 | Dodd |
| 6,669,088 | B2 | 12/2003 | Veeneman |
| 6,912,505 | B2 | 6/2005 | Linden et al. |
| 6,917,922 | B1 | 7/2005 | Bezos et al. |
| 6,999,941 | B1 | 2/2006 | Agarwal |
| 7,188,081 | B1 | 3/2007 | Shah |
| 7,222,087 | B1 | 5/2007 | Bezos et al. |
| 7,249,050 | B1 | 7/2007 | Walker et al. |
| 7,356,490 | B1 * | 4/2008 | Jacobi et al. ................ 705/26.8 |
| 7,702,545 | B1 | 4/2010 | Compton et al. |
| 2001/0013054 | A1 | 8/2001 | Okawa et al. |
| 2001/0034609 | A1 | 10/2001 | Dovolis |
| 2001/0049636 | A1 | 12/2001 | Hudda et al. |
| 2001/0051876 | A1 | 12/2001 | Seigel et al. |
| 2002/0019763 | A1 | 2/2002 | Linden et al. |
| 2002/0026369 | A1 | 2/2002 | Miller et al. |
| 2002/0077929 | A1 | 6/2002 | Knorr et al. |
| 2002/0103789 | A1 | 8/2002 | Turnbull et al. |
| 2002/0128934 | A1 | 9/2002 | Shaer |
| 2002/0143664 | A1 * | 10/2002 | Webb ............................. 705/27 |
| 2002/0169851 | A1 | 11/2002 | Weathersby et al. |
| 2002/0194087 | A1 | 12/2002 | Spiegel et al. |
| 2002/0198882 | A1 | 12/2002 | Linden et al. |
| 2003/0023687 | A1 | 1/2003 | Wolfe |
| 2003/0074253 | A1 | 4/2003 | Scheuring et al. |
| 2003/0074265 | A1 | 4/2003 | Oshima |
| 2003/0078835 | A1 | 4/2003 | Pluchinske |
| 2003/0083961 | A1 | 5/2003 | Bezos et al. |
| 2003/0105682 | A1 | 6/2003 | Dicker et al. |
| 2003/0154135 | A1 | 8/2003 | Covington et al. |
| 2003/0204449 | A1 | 10/2003 | Kotas et al. |
| 2003/0233283 | A1 * | 12/2003 | Shah ............................. 705/26 |
| 2004/0015415 | A1 | 1/2004 | Cofino et al. |
| 2004/0098315 | A1 | 5/2004 | Haynes et al. |
| 2005/0010486 | A1 | 1/2005 | Pandhe |
| 2005/0125309 | A1 | 6/2005 | Song |
| 2005/0177458 | A1 | 8/2005 | Martineau et al. |
| 2005/0283405 | A1 | 12/2005 | Mallo et al. |
| 2006/0047649 | A1 | 3/2006 | Liang |
| 2006/0173751 | A1 | 8/2006 | Schwarze et al. |
| 2007/0073758 | A1 | 3/2007 | Perry et al. |
| 2007/0106627 | A1 | 5/2007 | Srivastava et al. |
| 2007/0233736 | A1 | 10/2007 | Xiong et al. |
| 2007/0299829 | A1 | 12/2007 | Boinus et al. |
| 2008/0097880 | A1 | 4/2008 | Landberg |
| 2009/0083164 | A1 | 3/2009 | Hull et al. |
| 2009/0106396 | A1 | 4/2009 | Nakajima |

FOREIGN PATENT DOCUMENTS

| | | |
|---|---|---|
| WO | WO0031657 A2 | 6/2000 |
| WO | WO0062223 A1 | 10/2000 |
| WO | WO0077703 A1 | 12/2000 |

OTHER PUBLICATIONS

Amazon.com: Wish List, www.amazon.com [accessed May 21, 2008], pp. 1.

Boxedup.com Things I Want, Like, Have, www.boxedup.com [accessed May 21, 2008], pp. 1.

Camera Phones Granting Wishes, According to Textamerica, BusinessWire, Nov. 19, 2003, New York.

FindGift.com Gift Giving Made Easy, www.findgift.com [accessed May 21, 2008], pp. 1.

"Fred Pryor Seminars," dated Mar. 6, 2005, located at http://web.archive.org/web/20050306234345/http://www.pryor.com/faq.asp, accessed from Internet Archive on Jan. 19, 2012.

Get Started With Kaboodle, Kaboodle, Inc., www.kaboodle.com [accessed Oct. 30, 2007], Copyright 2007, pp. 4.

Gift Box Because a Gift is Worth a Thousand Words . . . , www.giftbox.com [accessed May 21, 2008], pp. 1.

Goldman, A., Online Registries Wed Choice, Convenience, The Oregonian, Jul. 11, 1999, pp. L19, Portland, Oregon.

Google Product Search, www.google.com/products [accessed May 21, 2008].

Hintdropper.com The Ultimate Wish List, www.hintdropper.com [accessed May 21, 2008], pp. 1.

ListIdeas the Gifts You Want, List It, www.listideas.com [accessed May 21, 2008], Copyright 2006, pp. 5.

MSN Shopping, http://shopping.msn.com [accessed May 21, 2008], pp. 1.

MyGifts.com Give the People What They Want, MyGifts.com, Inc., www.mygifts.com [accessed May 21, 2008], Copyright 2001, pp. 1.

MyThings Organize All Your Things in One Place, MyThings Inc., www.mythings.com [accessed May 21, 2008], Copyright 2006-2008, pp. 1.

Scheraga, D., Penney's Net Advantage, Chain Store Age, retrieved from Dialog File: 15 #02067152, Sep. 2000, vol. 76, Issue 9.

ShopBop.com Wish List, www.shopbop.com [accessed May 21, 2008], Copyright 2008, pp. 1.

Stylehive Connecting Stylish People, www.stylehive.com [accessed May 21, 2008], pp. 1.

TheThingsIWant.com, www.thethingsiwant.com [accessed Oct. 30, 2007], pp. 2.

Things I Don't Need to Be Happy Is More Stuff Really What You Need?, www.thingsidontneedtobehappy.com [accessed May 21, 2008], pp. 1.

ThisNext, www.thisnext.com [accessed May 21, 2008], pp. 1.

What I Want Most, www.whatiwantmost.com [accessed May 21, 2008], pp. 1.

What is the Gift Hat?, www.gifthat.com [accessed May 21, 2008], pp. 1.

What is Wishlist Buddy?, www.wishlistbuddy.com [accessed May 21, 2008], pp. 1.

Wish Central Your Online Personal Wish List, www.wishcentral.com [accessed May 21, 2008], pp. 1.

Wishlist Create a WishList, WishList.com, www.wishlist.com [accessed May 21, 2008], Copyright 2008.

Wishlisting What Are You Wishing For?, www.wishlisting.com, pp. 2.

WishListr Let the World Know What You Desire, www.lishlistr.com, pp. 1.

Wishpot Beta What Are You Wishing For?, Wishpot, Inc., www.wishpot.com [accessed May 21, 2008], Copyright 2005-2008.

WishRadar Target Acquired, www.wishradar.com [accessed May 21, 2008], pp. 1.

WishRoll, Miracoli Lab, www.wishroll.com [accessed May 21, 2008], Copyright 2006, pp. 3.

Wists Social Shopping, www.wists.com [accessed May 21, 2008], pp. 1.

* cited by examiner

CREATING AND MAINTAINING ELECTRONIC GIFT LISTS

REFERENCE TO RELATED APPLICATION

This application is a continuation of U.S. patent application Ser. No. 11/557,447, filed Nov. 7, 2006, titled CREATING AND MAINTAINING GIFT LISTS IN ONLINE SHOPPING, the disclosure of which is hereby incorporated by reference in its entirety.

BACKGROUND

Electronic commerce is an increasingly popular way of conducting business, typically, but not exclusively, including activities such as browsing for items; comparing product aspects such as price, color, warranties, and the like for multiple items; inspecting product details of an item; purchasing one or more items; and the like. More and more vendors are making their products and services available over electronic networks, such as the Internet and computer users have embraced electronic commerce as a legitimate shopping environment.

Both vendors and computer users greatly benefit from electronic commerce in a variety of ways. For example, users do not have to travel to a number of vendor locales to purchase a given item. Rather, a user can now purchase a desired item from the convenience of his or her home. Further, users can quickly compare a wide variety of similar products and prices from a number of vendors in order to make an informed choice in their purchases rather than spending an entire afternoon in comparison shopping. Vendors are benefited in that they can reach a much larger group of customers than those who reside in their geographic vicinity.

There are some disadvantages associated with electronic commerce. A computer user cannot try on or try out a physical product found on a vendor's electronic commerce site without visiting a so-called "brick and mortar" store. Short of visiting a physical store, the computer user must make a choice based on published information. Further, a computer user cannot request information from a knowledgeable salesperson during his/her shopping experience, though there are efforts being made to provide a comparable electronic service.

One feature of shopping, in general, that has been a mainstay of many people is the gift list, i.e., maintaining one or more lists of items that may be desirable to be purchased as gifts for another person. Many people maintain gift lists for their family, friends, colleagues, assistants, etc., such that when a gift-giving occasion arises, such as a birthday, Christmas, anniversary, graduation, retirement, and the like, they already know what to give and, quite often, where to get it.

Of course, a computer user may reference his or her gift lists during electronic commerce activities. However, this requires cumbersome coordination efforts between browsing experience and referencing a gift list. This coordination may be especially frustrating when the computer user is adding information to a gift list regarding a particular item located while browsing for items, including switching back and forth between a browser and a printed or electronic day planner or PIM (personal information manager). Clearly, it would be beneficial if a computer user's electronic shopping experience could be enhanced or integrated with the ability to maintain one or more gift lists for others.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A system for maintaining gift lists for other persons is presented. The system includes a data store and a computing device. The data store stores at least information related to items available for purchase. The computing device is in communication with and has access to the data store. Moreover, the computing device is configured to create a gift list. The gift list includes references to items that are available for purchase by a user, and that are selected by a user as potential gifts for another. Additionally, access to the gift list is controlled by the user that created the gift list. The computing device is further configured in such a way as to add a reference to an item to the gift list while the user browses the items available for purchase.

In addition to the above, the computing device is configured to associate a gift-giving occasion with the created gift list, and provide user notification of the gift-giving occasion.

A computer-implemented method for maintaining a gift list is presented. In at least one embodiment, the method comprises each of the following steps. As one step, a user is enabled to view a multiple items available for purchase via the user's browser. As an additional step, a gift list is created to store references to items available for purchase that are selected by the user as potential gifts for another person. Access to the gift list is controlled the by user. As yet another step, the gift list is stored in a data store.

A computer-readable medium is presented, the computer-readable medium having a computer-executable component for maintaining a gift list. Gift lists comprise references to items available for purchase that are selected by a user as potential gifts for another person. The computer-executable component comprises a user interface component. The user interface component enables a user to create a gift list. As mentioned, the gift list stores references to items available for purchase that are selected by the user as potential gifts for another person. Access to the gift list is controlled the by user. The user interface component also enables the user to add a reference to an item available for purchase to the gift list.

A method for maintaining a gift list is presented. The method comprises a step of providing display information regarding a plurality of items available for purchase. The method also includes a step of creating a gift list for another person. The gift list stores references to items available for purchase that are selected by a user as potential gifts for another person. All access to the first gift list is controlled by the user. The method further includes the step of storing the gift list in a data store. Still further, the method includes the step of adding a reference to an item available for purchase to the first gift list at the direction of the user.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
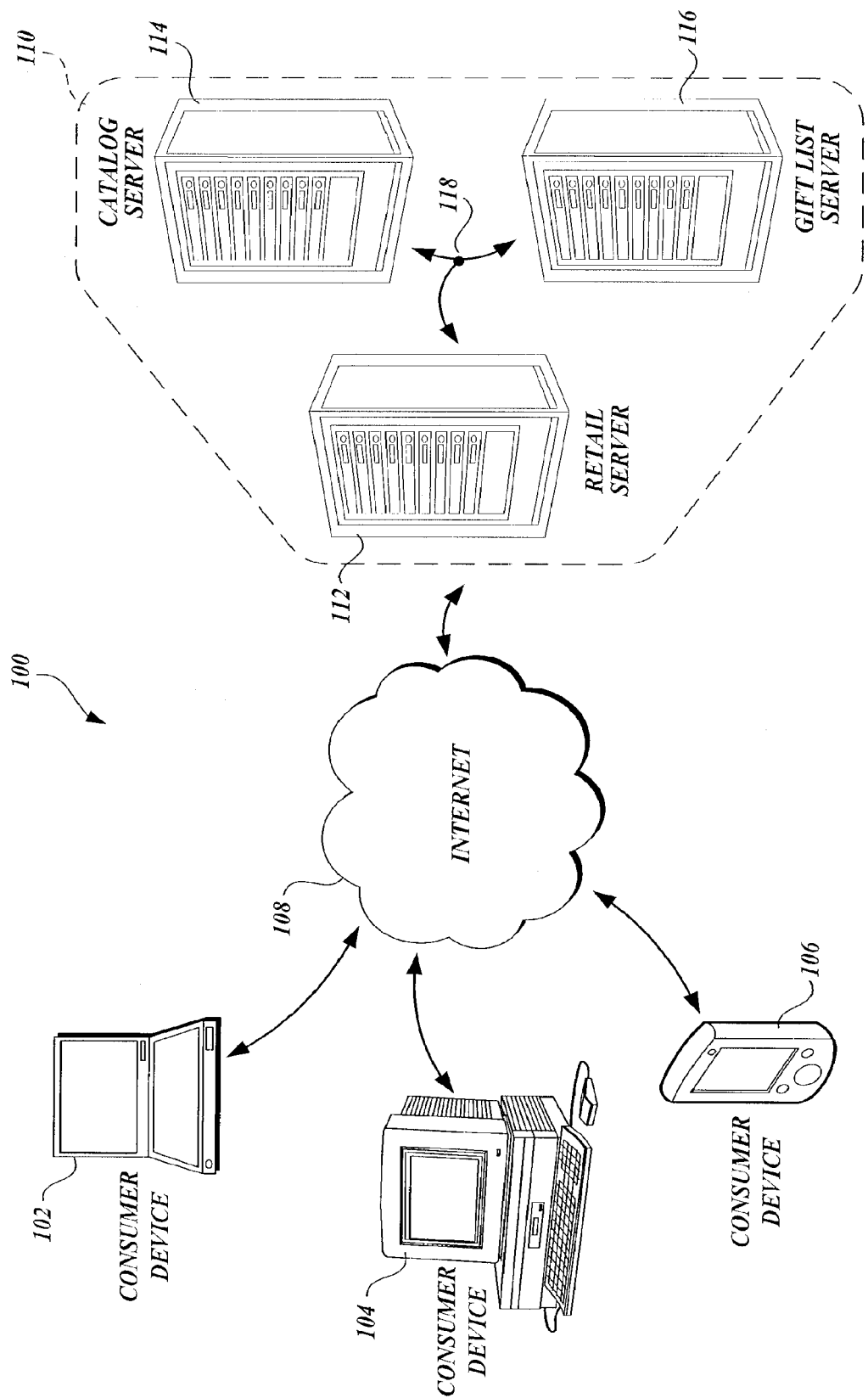
FIG. 1 is a pictorial diagram of an illustrative network environment suitable for conducting electronic gift list services integrated within electronic shopping activities.

For purposes of the following discussion, a gift list is a list of references to items (products or services) that are placed on the list as potential gifts for another person or entity. While a gift list may include both products and services, for simplicity in presentation, the following discussion will be in regard to "items" or "gift items" that include both products and services. Similarly, while a gift list may be created and maintained for an entity other than a person, such as an organization, a team, a couple, and the like, the following discussion will generally be made with regard to "another person" or "other person," and it should be understood that this other "person" may be an entity other than a person.

A gift list, according to the present invention, is distinct from both gift registries and wish lists, both of which are presently available in various electronic commerce (also referred to as e-commerce) environments. In particular, a gift list is a list of references to items that are placed thereon as gifts or gift ideas for another person. Accordingly, a gift list is personal to the computer user that creates it, meaning that a gift list is created and maintained as a personal list for a particular computer user. As a personal list, access to a gift list is therefore controlled by the user, even though the object or target of a gift list is for another computer user. In various alternative embodiments, if a computer user creates a gift list, the creator/computer user can transfer information on the gift list to a public list such as a gift registry, provide access to the gift list to another computer user, or provide a copy of the gift list to another computer user for their use.

In contrast to a gift list, electronic wish lists are lists of references to items that are desired for the wish list's creator, i.e., a list of items the list creator wishes to obtain. Quite often, wish lists may be made available to other computer users with suggestions as to what gifts the wish list creator would like to receive. Similarly, gift registries are lists created for users, couples, or entities that are published for others. In a similar fashion to published wish lists, desirable items may be placed on a registry list by the targeted user/couple/entity such that others can then purchase items for the targeted user/couple/entity. Purchased items are recorded on the registry list such that others do not duplicate the gift. In sum, wish lists and gift registries are lists of items intended for the list creator and are frequently shared with or accessible to other users. Gift lists are personal to the list creator and intended for another.

In regard to placing items on a gift list, while some items that could serve as gifts are entirely electronic in nature such that they could actually be stored on the gift list (such as music and/or video files, electronic books, computer games, etc.), those skilled in the art will appreciate that, in general, the phrase "placing an item" on a gift list refers to placing a reference to an item on the gift list. Accordingly, while the following discussion will generally use the phrase "placing an item" on a gift list, this term should be interpreted as placing a reference to the item or the item itself on the gift list.

In the following description, numerous specific details are set forth in order to provide a thorough understanding of the present invention. However, it will be apparent to one skilled in the art that the invention may be practiced without some or all of these specific details. In other instances, well-known process steps have not been described in detail in order not to unnecessarily obscure the invention.

With regard to an operating environment suitable for implementing aspects of the present invention, while there are numerous environments in which electronic shopping or e-commerce may occur, FIG. 1 is a pictorial diagram of an illustrative networked environment 100 suitable for conducting electronic gift list services integrated within electronic shopping activities. The illustrative networked environment 100 of FIG. 1 includes one or more consumer devices, such as consumer devices 102-106, through which consumers (not shown) can conduct electronic shopping. The consumer devices communicate via a communication network, such as the Internet 108, with a network shopping service 110 to conduct electronic shopping.

Consumer devices, such as consumer devices 102-106, are typically computing devices including a variety of configurations or forms such as, but not limited to, laptop or tablet computers, personal computers, personal digital assistants (PDAs), hybrid PDA/mobile phones, mobile phones, electronic book readers, workstations, and the like. A general architecture of a consumer device is described below in regard to FIG. 2.

Figure 2:
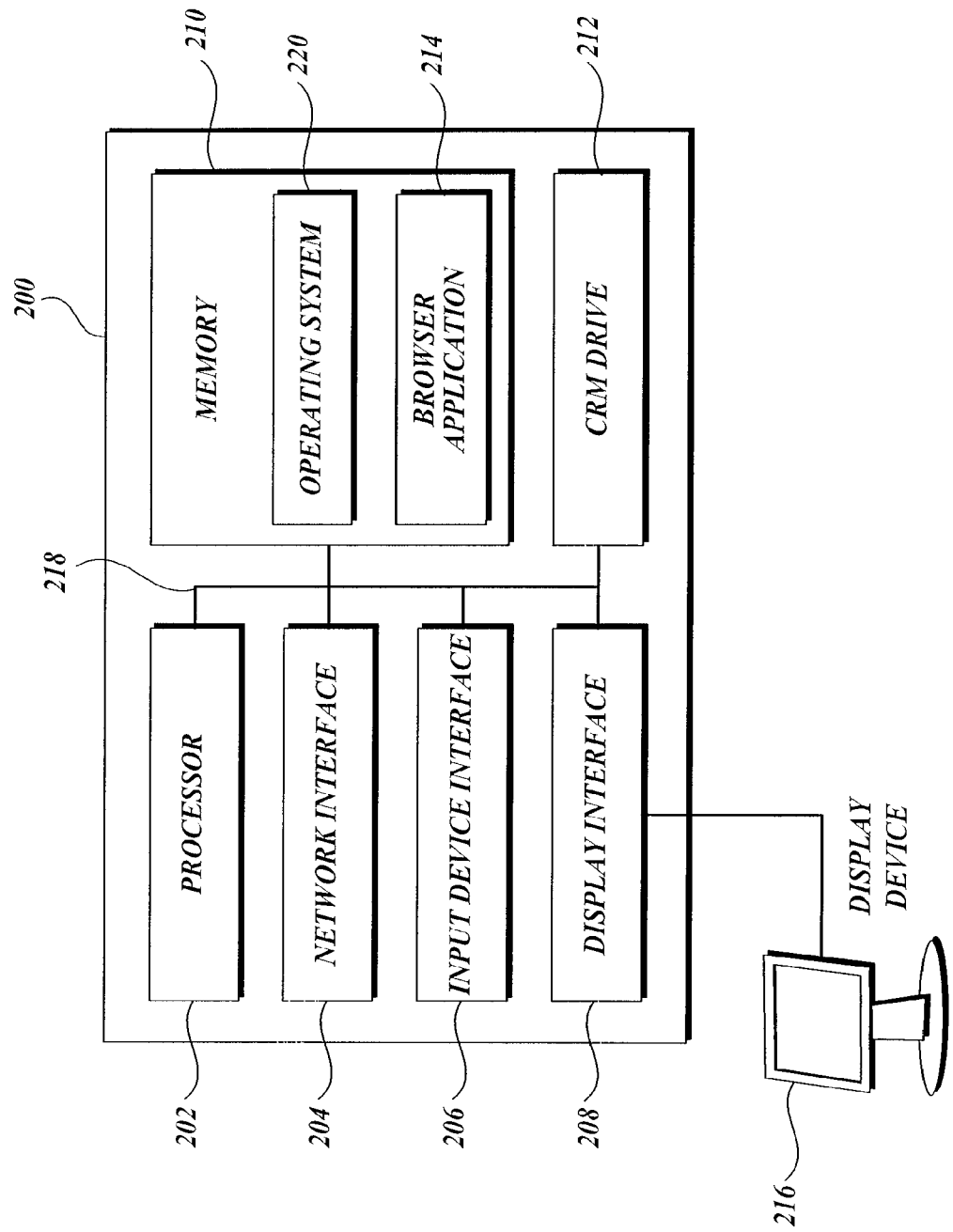
FIG. 2 is a block diagram of illustrative components of a consumer device suitable for conducting user-related aspects of electronic gift list services during electronic shopping activity.

FIG. 2 is a block diagram of illustrative components of a consumer device suitable for conducting electronic shopping and interacting with integrated gift list services via a communication network such as the Internet 108. Of course, while various components are described below, those skilled in the art of computers will recognize a wide selection of commercially available components that can be used to construct a consumer device suitable for conducting electronic shopping and interacting with gift list services. Accordingly, the following description of components of a consumer device should be viewed as illustrative only and not construed as limiting in any manner.

With regard to FIG. 2, the illustrated consumer device 200 includes a processor 202 in communication with a variety of other components over a system bus 218. The illustrated components include, by way of example, a network interface 204, an input device interface 206, a display interface 208, an optional computer-readable medium drive 212, and a memory 210. As appreciated by those skilled in the art, the network interface 204 enables the consumer device 200 to communicate data, control signals, data requests, and other information with a computer network such as the Internet 108 (FIG. 1). The network interface 204 may be configured to communicate with the Internet 108 over a wired or wireless connection (not shown).

The input device interface 206, sometimes also embodied as an input/output interface, enables the consumer device 200 to obtain input from the consumer, part of which is directed to the purchase. Input devices (not shown) in communication with the input device interface 206 may include, but are not limited to, a digital pen, a touch screen, a keyboard, a mouse, and the like. In addition, a display interface 208 is typically connected to a display device 216 (e.g., a CRT monitor, an LCD screen, a television, etc.) for visually displaying information to the consumer. Those skilled in the art will appreciate that the display device 216 may be incorporated within a consumer device as an integral element of the consumer device or, alternatively, may be an external component that is attached to the consumer device. FIG. 2 illustrates that the display device 216 is external to the consumer device 200, but this is illustrative only.

The processor 202 is configured to operate in accordance with programming instructions stored in a memory, such as the memory 210. The memory 210 generally comprises RAM, ROM, and/or other permanent memory. Thus, in addition to storage in read/write memory (RAM), programming instructions may also be embodied in read-only format, such as those found in ROM or other permanent memory.

The memory 210 also typically stores an operating system 220 for controlling the general operation of the consumer device 200. The operating system may be a general purpose operating system such as a MICROSOFT® operating system, a UNIX® operating system, a LINUX® operating system, or an operating system specifically written for and tailored to a particular consumer device 200. The memory 210 may further store user-executable applications or programs for conducting various functions on the consumer device 200. For example, FIG. 2 illustrates that memory 210 includes a browser application 214 that may be used by the consumer to navigate on the Internet 108 and through which the consumer may communicate via the Internet 108 to interact with electronic shopping and gift list services provided by the network shopping service 110. Examples of a browser application 214 include Microsoft's INTERNET EXPLORER® browser application, Mozilla's FIREFOX® browser application, Opera Software ASA's OPERA® browser application, and the like.

The computer-readable medium drive 212 provides an optional and alternative means by which a consumer may store information and/or retrieve external information. Examples of computer-readable medium drives include, but are not limited to, CD-ROM drives, DVD-ROM drives, floppy disk drives, USB drives, flash memory card readers, and the like. Of course, while a computer-readable medium drive 212 is shown in the illustrative consumer device 200, it should be viewed as an optional component. Those skilled in the art will appreciate that not all consumer devices include a computer-readable medium drive 212. However, regardless of whether or not a consumer device 200 includes a computer-readable medium drive 212, the consumer device may be entirely suitable for interacting with gift list services while conducting electronic shopping transactions.

With reference again to FIG. 1, as mentioned above, the consumer devices 102-106 are connected to a network shopping service 110 via a communication network, such as the Internet 108. The network shopping service 110 provides pages offering retail services, including gift list services, to consumers via their consumer devices for conducting shopping activities.

While illustrated in FIG. 1 as comprising multiple servers, the network shopping service 110 may comprise one or multiple servers or discrete components to provide shopping and retail services over a network. As particularly shown in FIG. 1, the illustrated network shopping service 110 is comprised of multiple components, including a retail server 112 that provides the "front end" interface to consumers via their consumer devices 102-106, a catalog server 114 that provides general information for items available for purchase from the network shopping service, and a gift list server 116 that provides gift list services to a consumer during the consumer's electronic shopping activities. Of course, those skilled in the art will, of course, appreciate that the various servers/components of the network shopping service 110 depicted in FIG. 1 are illustrative only. As mentioned above, an actual embodiment of a network shopping service 110 may be comprised of a single server or a plurality of discrete, cooperative servers distributed in a communications network 118. Similarly, the identified components of the network shopping service 110 should be viewed as logical components only, as each separately identified component, such as the catalog server 114, the retail server 112, and the gift list server 116, may be physically embodied on one or more computer systems, as well as combined with other hardware and/or software components not illustrated herein.

Figure 3:
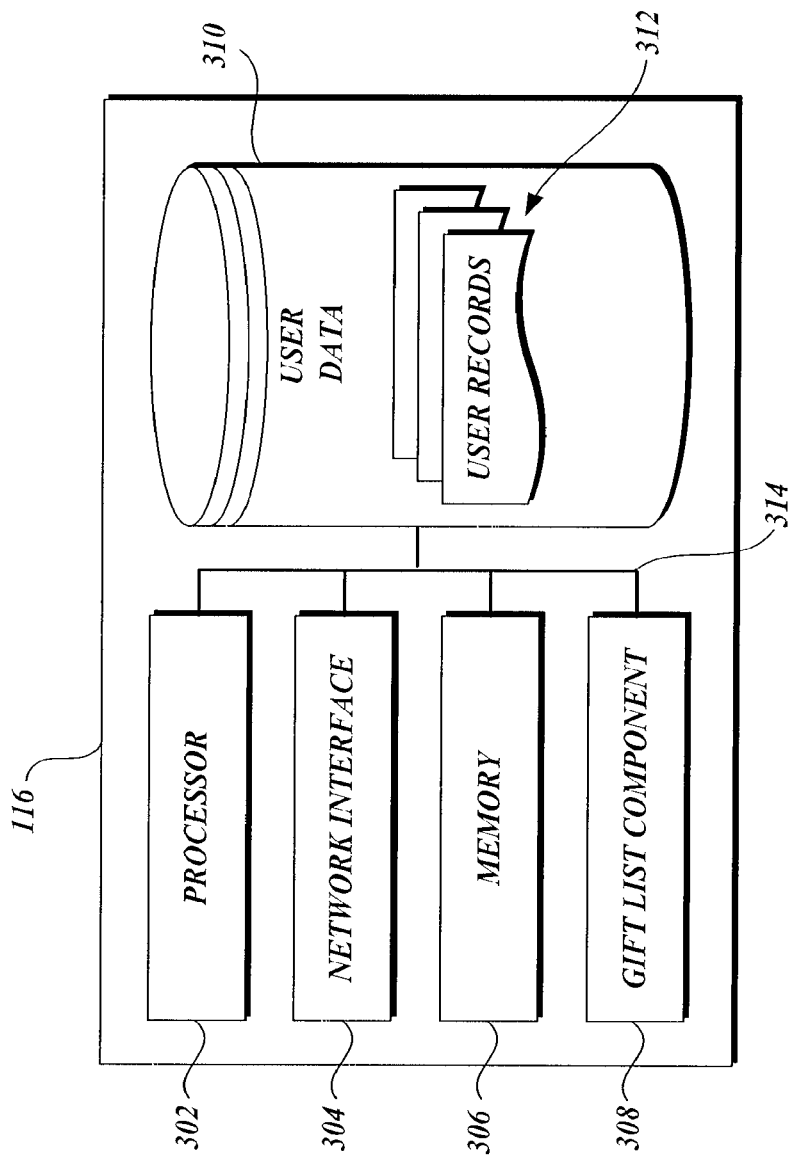
FIG. 3 is a block diagram of illustrative components of a gift list server suitable for use in the networked environment depicted in FIG. 1 for carrying out aspects of electronic gift list services during electronic shopping activity.

FIG. 3 is a block diagram of illustrative components of a gift list server 116 that are suitable for providing electronic gift list services during a user's e-commerce activities. More particularly, the gift list server 116 provides the gift list services to the network shopping service 110 in both offering gift list functionality as well as responding to user requests with regard to the gift list services. However, while the gift list server 116, as illustrated in FIG. 3, is demonstrated as a single integrated computing device, this is illustrative only. In an actual embodiment, the gift list server 116 may be embodied in a plurality of servers or integrated with one or more other servers within the network shopping service 110.

The illustrative gift list server 116 includes a processor 302 in communication with a variety of other components over a system bus 314. As will be described below in greater detail, the processor 302 executes one or more code modules that carry out the gift list services, such as the gift list component 308. The illustrative gift list server 116 also includes, but is not limited to, a network interface 304, a memory 306, and a user data store 310.

As with the consumer device 200, the processor 302 is configured to operate in accordance with programming instructions stored in the memory 306, which is generally comprised of RAM, ROM, and/or other permanent memory. The memory 306 will typically store an operating system (not shown) for the gift list server 116 upon which, and with which, most other programs/applications operate, including the gift list component 308. Additionally, while the gift list component 308 is illustrated as existing outside of the memory 306, this is for illustration purposes only. Under most circumstances, the gift list component 308 will reside within the memory 306.

The network interface is used by the gift list server 116 to communicate with other components of the network shopping service 110 and/or a consumer device in providing the gift list server's functionality. The user data store 310 is a data store that includes user records 312 corresponding to those users that take advantage of the gift list abilities of the gift list server 116. Sample information stored in the user records 312 is discussed in greater detail in regard to FIG. 4.

Figure 4:
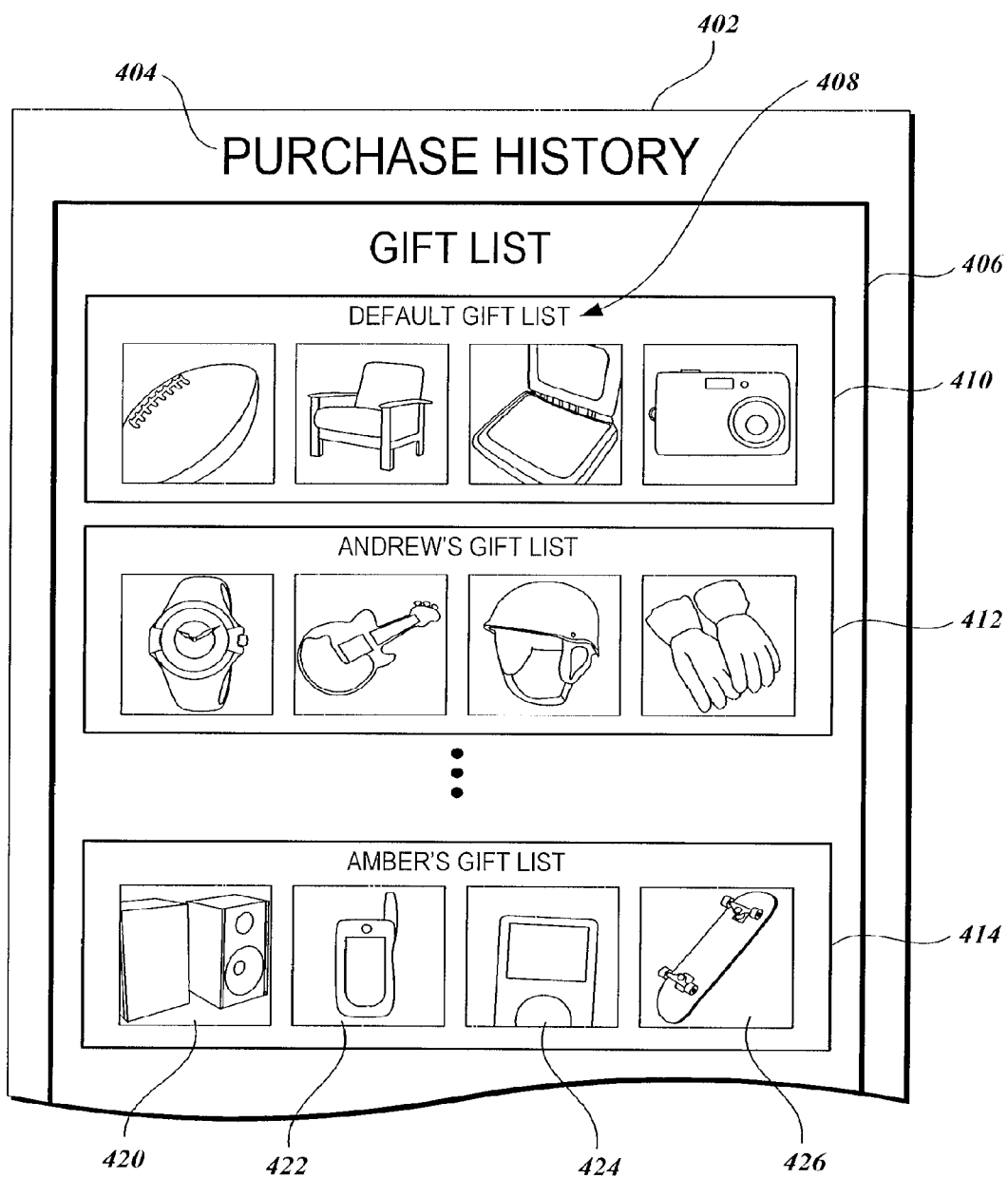
FIG. 4 is a block diagram of illustrative information stored in a user record residing in the user data store of FIG. 3 for maintaining gift lists.

FIG. 4 is a block diagram of illustrative information stored in a user record 402 residing in the user data store 310 (FIG. 3) for maintaining a user's gift lists and related information. More particularly, an illustrative user record 402 includes a gift list store 406 that holds any number of gift lists that have been created by the user. For example, the sample gift list store 406 illustrates three gift lists, lists 410-414, though this is illustrative only. Also indicated, while each gift list may include items placed there by the corresponding user, such as represented by items 420 and 422, a gift list may also include system-supplied recommendations, such as recommendations 424 and 426.

The illustrative user record 402 also is shown as including the user's purchase history 404. The user's purchase history can play an important function with regard to gift lists as it stores what the user has purchased, and further allows the user to associate a purchased item with a gift list. Of course, in an alternative embodiment, a user's purchase history 404 may be stored in another location within the network shopping service 110, rather than in the user records in the user data store 310.

According to other aspects, gift lists are distinguished by a gift list name. The gift list server 116 may automatically provide a name if the user fails to do so or, alternatively, require that the user input a unique name for a newly created gift list. As shown in FIG. 4, the illustrative user record 400 includes a default gift list 410 representing a server-provided name 408, as well as two user-named gift lists, 412 and 414, that were explicitly named by the user.

Figure 5:
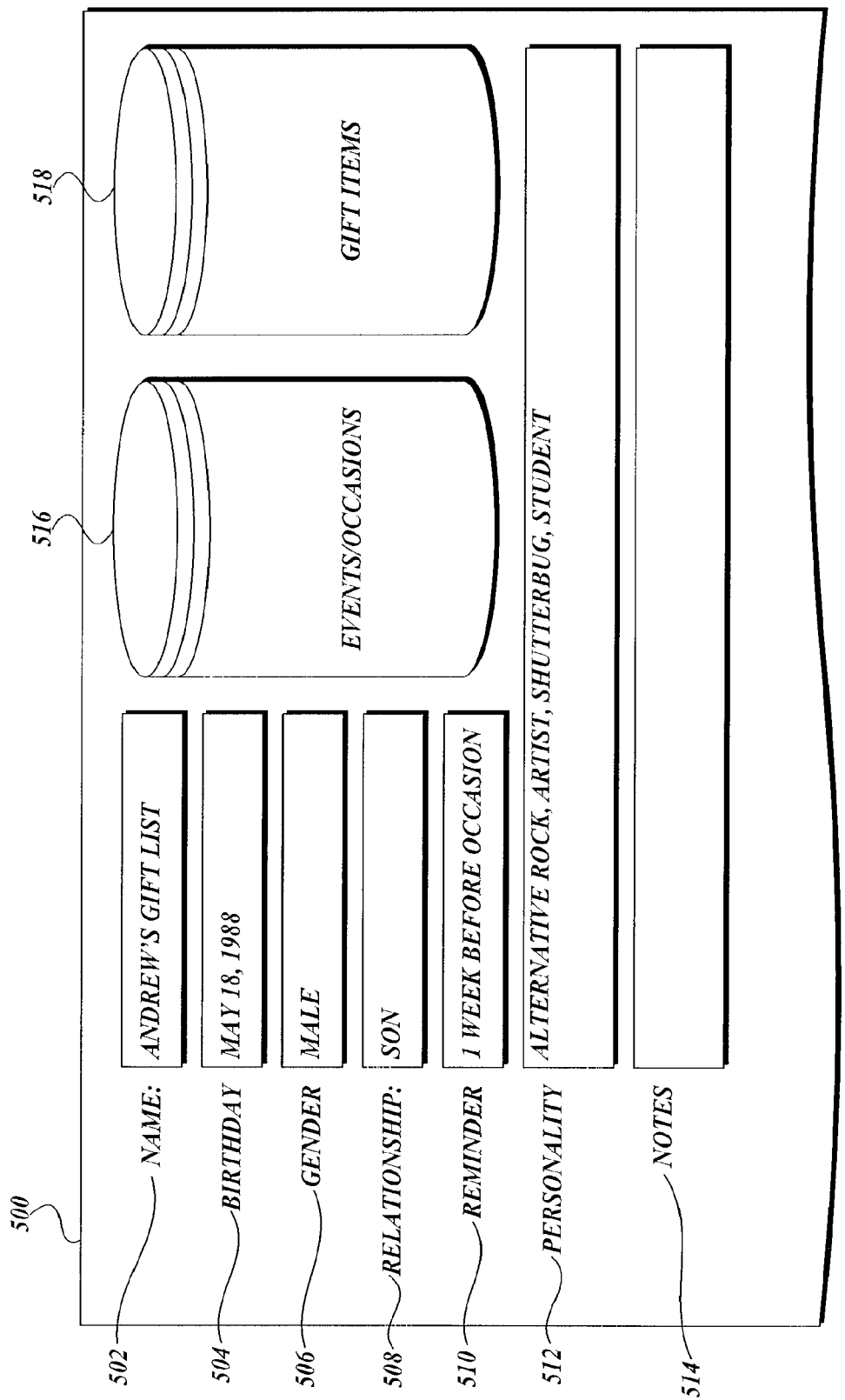
FIG. 5 is a block diagram of illustrative information associated with a user's gift list.

In addition to a gift list name, and in order to enhance the services that can be offered to a user with regard to a gift list, a user can optionally provide additional information for each gift list. To that end, FIG. 5 is a block diagram of illustrative information associated with each gift list, such as gift list 412. As already suggested, each gift list 412 includes a gift list name 502 that identifies the particular gift list from all other gift lists created/owned by the user. Further, the gift list name 502 is the only field of the gift list information 500 that is viewed as being required, though the gift list server 116 may supply a default gift list name if a user does not.

Since a gift list 412 is frequently associated with a particular, targeted person, the gift list information 500 may optionally include information typically associated with a person generally, such as a birthday 504; gender information 506; relationship information 508 identifying the relationship between the user and the targeted person; reminder information 510 specifying when a reminder should be provided to the user regarding the targeted person; personality information 512 identifying various predefined personality traits; and user notes 514 for storing user-provided information regarding the target person of the gift list 412. Entering this user-provided information is described in greater detail below in regard to FIGS. 8 and 9.

The gift list information 500 also includes an events/occasions store 516 for storing events and/or occasions for which the user wishes to be reminded regarding the targeted person. One event, the birthday 504 of the targeted person, may be included in the events/occasions store 516, though if birthday information is kept specifically and separately, as illustrated in FIG. 5, it may not be necessary to store that information in the events/occasions store. The gift list information 500 also includes a gift items store 518 for storing those items placed on the gift list 412 by the user.

It should be appreciated that the gift list information 500 identified above represents sample information that may be provided with regard to a particular gift list 412. In an actual embodiment, any subset of the information described above, with perhaps the exception of the gift list name 502, as well as additional user-provided information, may be provided with regard to a particular gift list 412. Accordingly, the information described in regard to FIG. 5 as being part of gift list information 500 should be viewed as illustrative and not construed as limiting upon the present invention.

According to at least one embodiment of the present invention, based on the gift list information 500 provided for each gift list, the network shopping service 110 or a part thereof may provide gift recommendations when a user views a particular gift list. More particularly, as part of presenting information to a user in regard to one or more gift lists that the user has created, and in addition to listing those items that have been placed on the gift list by the user, the network shopping service 110 may also evaluate the gift list information 500 to identify additional items that the user might want to purchase for the targeted person. These recommended items may or may not be stored with the gift list, though if a user likes one of the recommendations, an actionable control is typically provided to store the recommended item on the gift list as a gift list item.

Figure 6A:
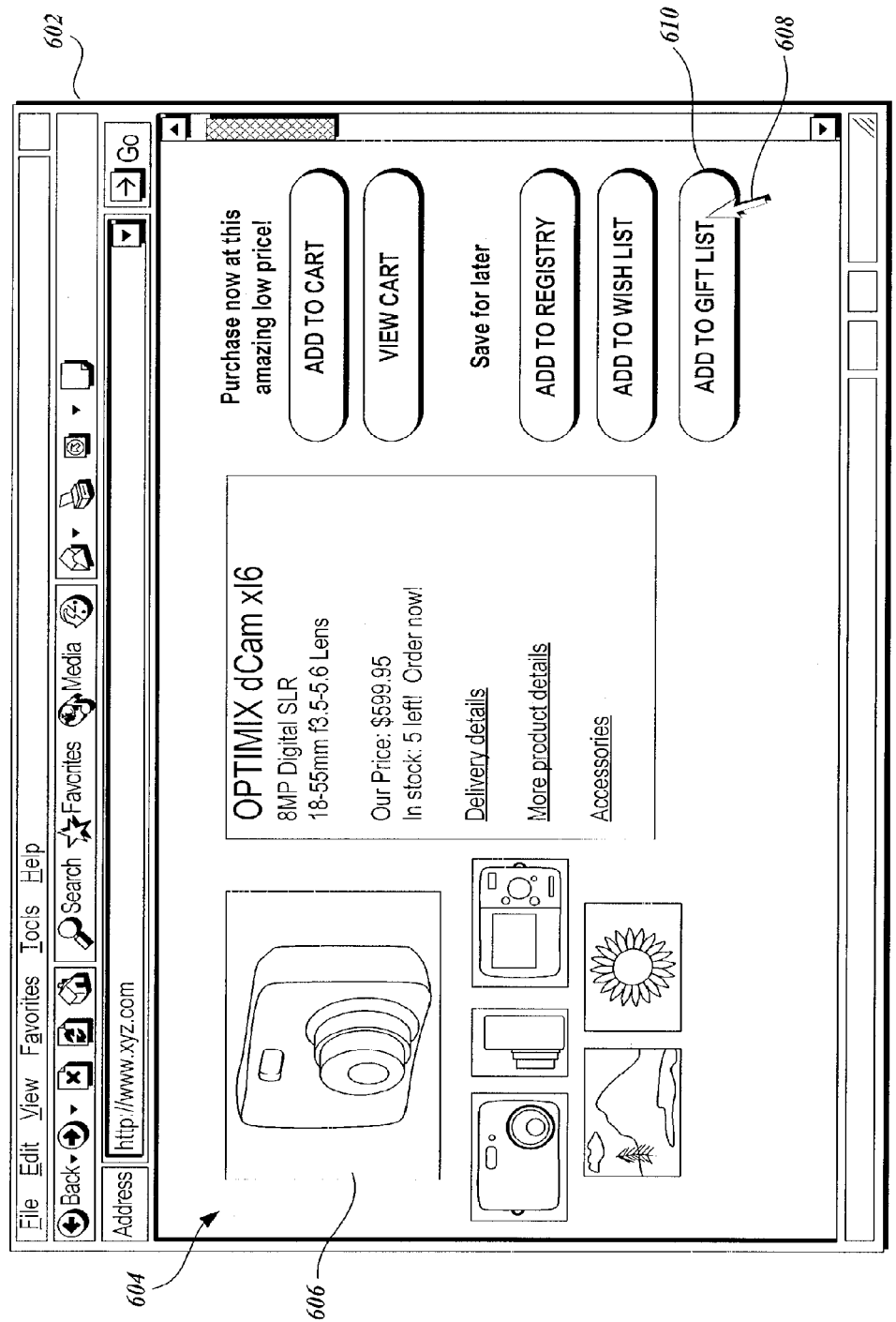
FIGS. 6A-6D are pictorial diagrams of an illustrative browser display showing an item offered for sale via electronic commerce, and for further illustrating at least one way in which the user may add the item to a gift list.
Figure 6B:
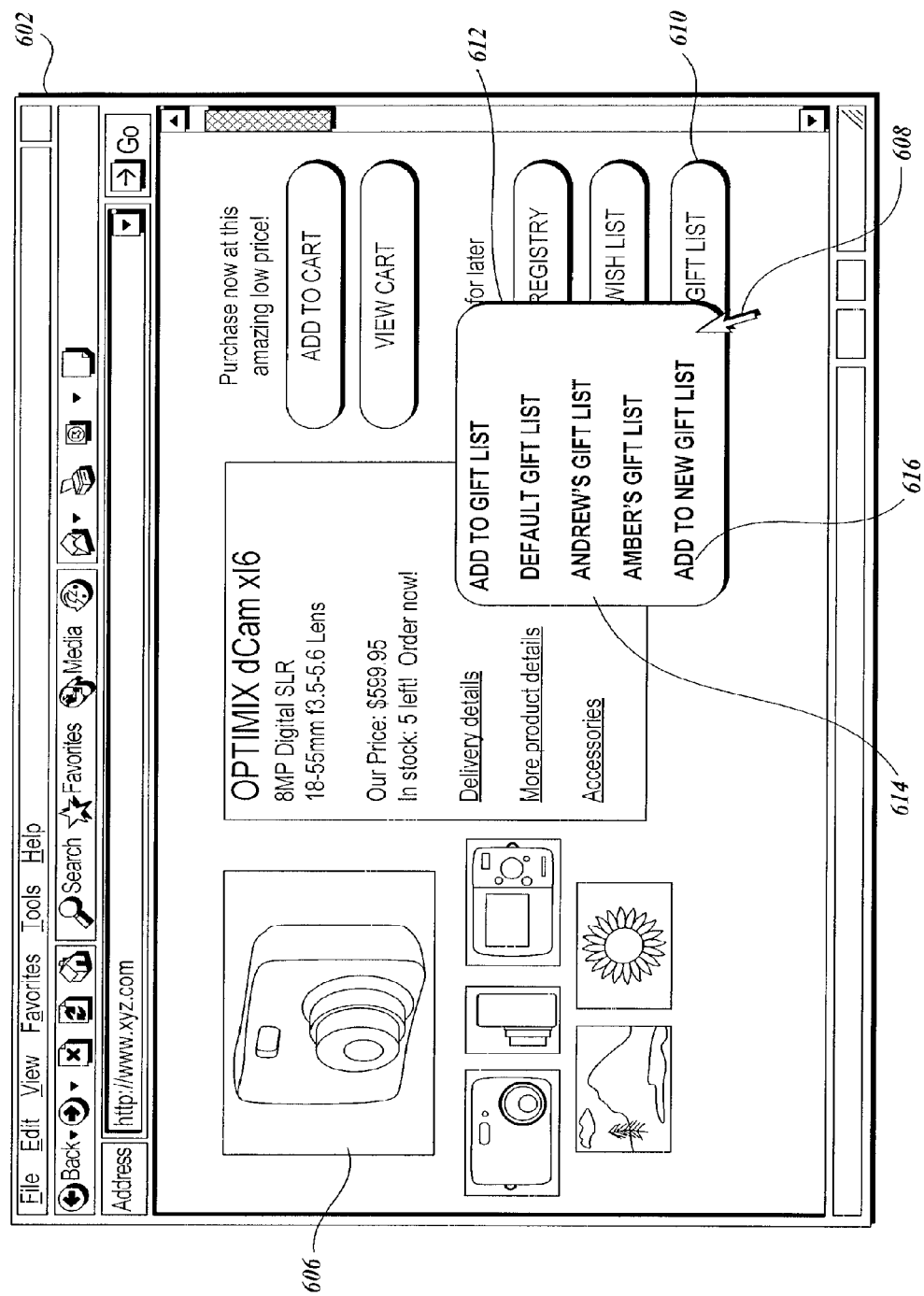
Figure 7:
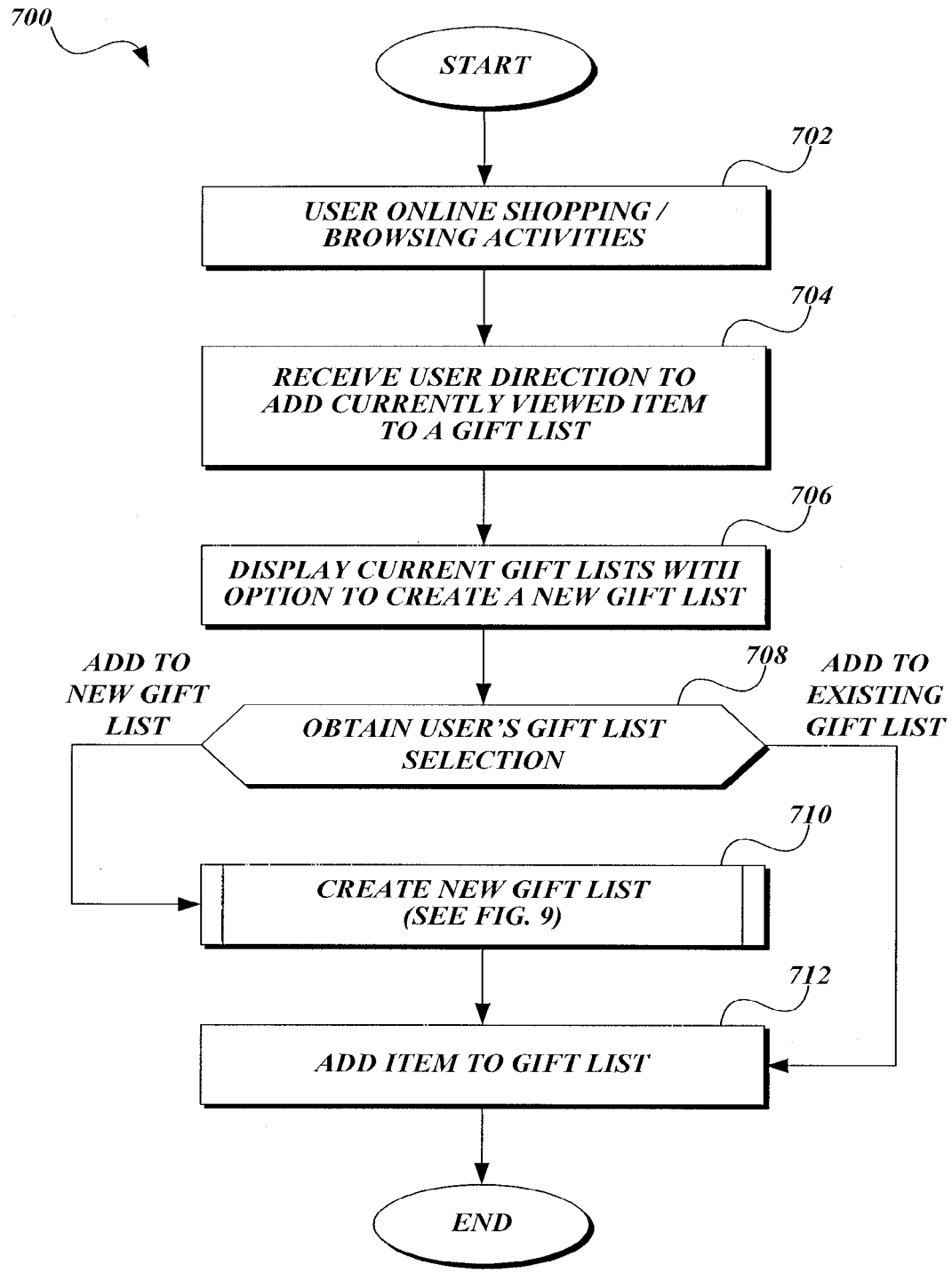
FIG. 7 is a flow diagram of an illustrative routine for adding an item to a gift list.

Turning now to FIGS. 6A, 6B, and 7, these figures are useful for illustrating how a gift list service 116 may be suitably integrated within a networked shopping service 110. More particularly, FIGS. 6A and 6B are pictorial diagrams illustrating browser displays 602 showing an item 606 offered for sale by a typical vendor via e-commerce activities. Moreover, FIGS. 6A and 6B further illustrate at least one path for how a user might add the browsed item to a gift list. Similarly, FIG. 7 is a flow diagram illustrating a routine 700 for adding an item to a gift list.

As shown in FIG. 7, the process begins at block 702 with a user browsing one of the various pages of a vendor's e-commerce services, such as page 604 displayed in browser 602 in FIG. 6A. According to this example, as the user realizes that the displayed item 606 might be an excellent gift for someone else, the user positions a pointer 608 over a control 610 and activates the control to add the item to a gift list. Correspondingly, at block 704, a user direction to add the currently viewed item 606 to a gift list is received.

With reference now to FIGS. 6B and 7, at block 706 the network shopping service 110 displays the user's currently defined gift lists, as well as an option to create an additional gift list. As shown in the illustrative diagram of FIG. 6B, in response to activating control 610, a pop-up window 612 is displayed for adding the currently viewed item 606 to a gift list.

At block 708, the network shopping service 110 obtains the user's input as to the gift selection. Correspondingly, using the pointer 608, the user can select from one of the already-created gift lists, such as the gift list corresponding to entry 614, or to create a new gift list by selecting entry 616.

Assuming that the user selects from one of the already created gift lists, at block 712, the currently viewed item 606 is added to the selected gift list. As shown in FIG. 6B, assuming that the user selects entry 614 corresponding to Andrew's Gift List, the currently viewed item 606 is added to that gift list.

While a button and pop-up window are displayed as part of the user actionable controls for adding an item to a gift list, these should be viewed as illustrative only and should not interpreted as limiting upon the present invention. Those skilled in the art will appreciate that any number of controls may be utilized to present the user with a selection of gift lists including, but not limited to, drop-down menus, tabs, and any number of custom controls specifically for this purpose.

Figure 6C:
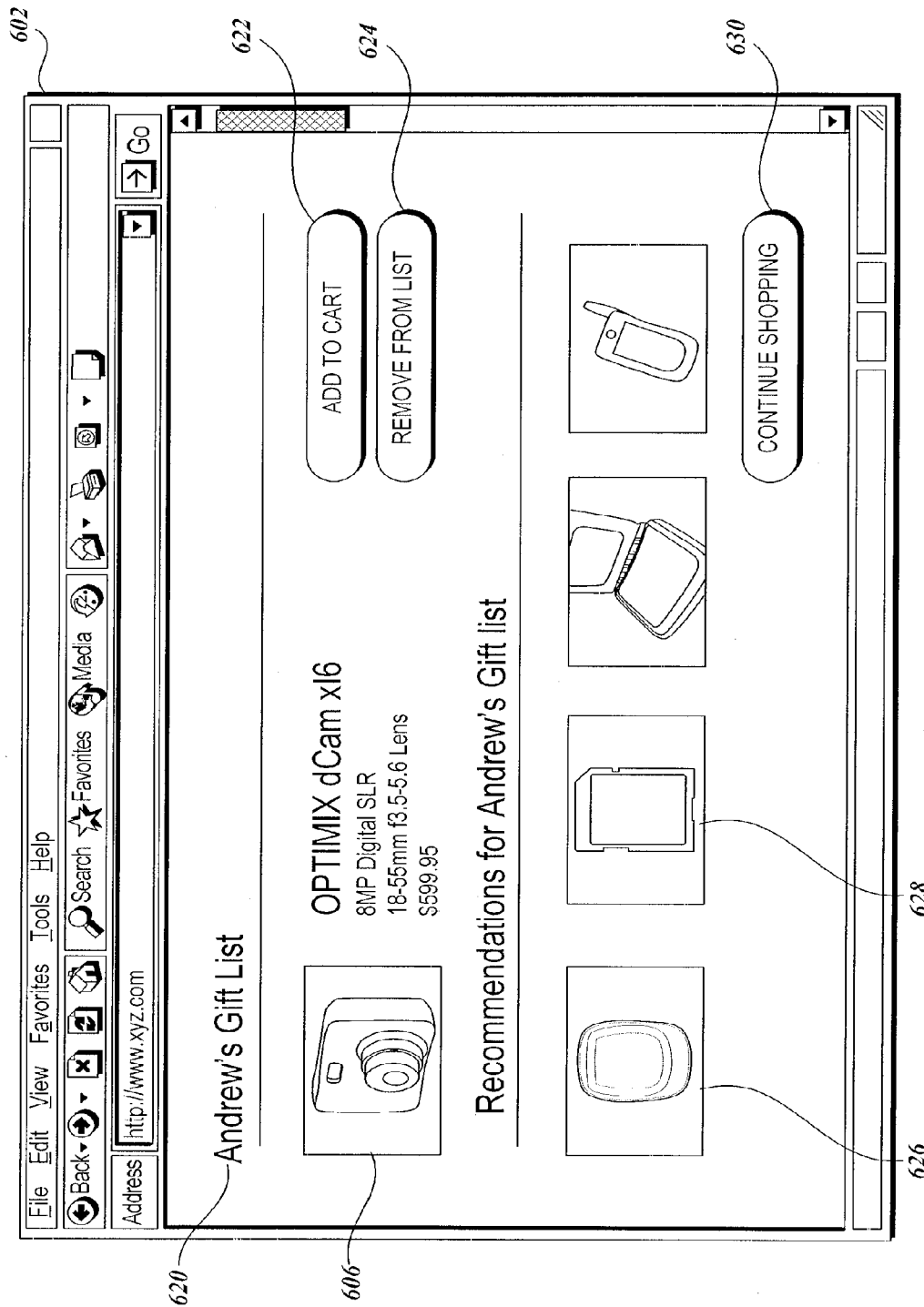

In one embodiment, once an item is added to an existing gift list, that gift list is displayed to the user. FIG. 6C illustrates an illustrative gift list displayed to a user via the user's browser. As can be seen, item 606 has been added to this existing gift list. Also optionally displayed are system-supplied recommendations, such as recommendations 626 and 628, based on user-provided information regarding the targeted person. In this illustrative display, the user can add the gift item 606 to an electronic cart via control 622, which will take the item off the gift list and place it in the user's purchase history, remove the gift item from the gift list via control 624, or simply return to shopping via control 630.

Returning again to FIG. 7, if the user instead chooses to add the currently viewed item 606 to a new gift list, the routine 700 proceeds to block 710 where the new gift list is first created. Creating gift lists is described below in regard to FIGS. 6D and 8.

While adding a current browsed item to a gift list is one way in which a user may add to a gift list, it should be appreciated that items may be added to a gift list other than through browsing a particular item. For example, as mentioned above, when viewing a gift list and recommendations are presented, a user may direct that a recommendation is added to the gift list. Alternatively, when editing or maintaining a gift list, a user may enter an item directly that does not necessarily correspond to any item being displayed or browsed by the user, though the user and/or the gift list services may associate this manually entered item with a particular vendor item if it is found.

Figure 6D:
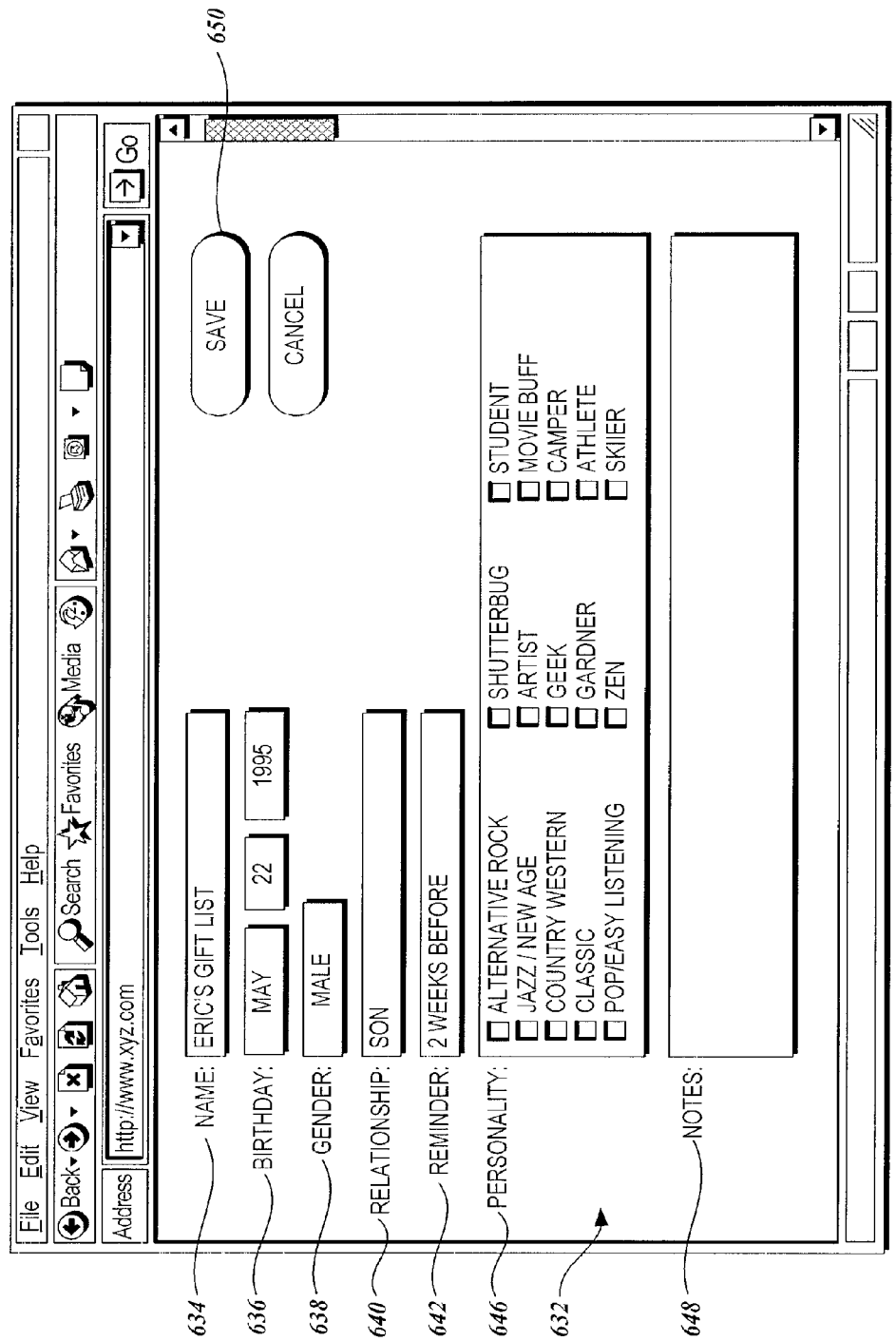
Figure 8:
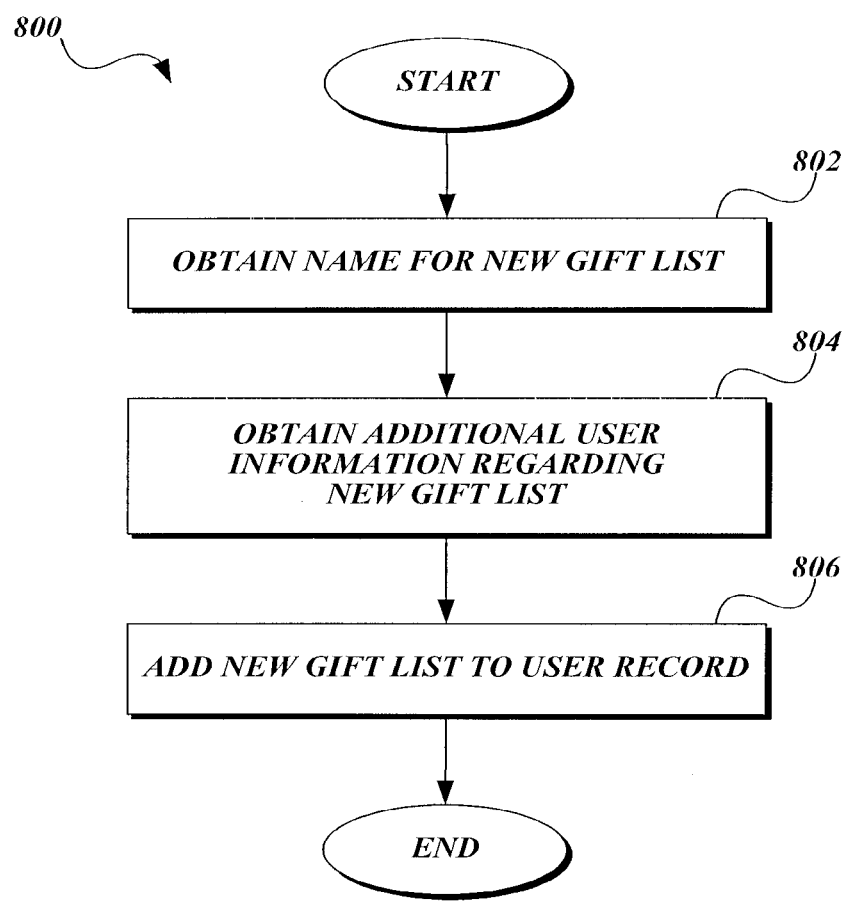
FIG. 8 is a flow diagram of an illustrative routine for creating the new gift list.

FIG. 6D is a pictorial diagram of an illustrative page for creating a new gift list and FIG. 8 is a flow diagram of an illustrative routine for creating the new gift list. More particularly, assuming that the user wants to create a new gift list, FIG. 6D is a pictorial diagram of an illustrative browser page 632 for creating a new gift list. Beginning at block 802, the user enters a gift list name 634. At block 804, additional information is optionally obtained regarding the targeted person. As discussed above, this information may include a birthday 636, the targeted person's gender 638, the relationship 640 between the user and the targeted person, a reminder 642 indicting how soon before a particular event or occasion the system should notify the user regarding obtaining a gift; personality traits 646 of the targeted person, and other notes 648 that the user wishes to maintain regarding this targeted person.

Once the profile information is entered, at block 806 the new gift list is added to the user's user record. As shown in FIG. 6D, the user will activate the control 650 to add the newly defined gift list to the user's user record. Thereafter, the routine 800 terminates.

Returning again to FIG. 7, once the gift list has been created, at block 712, the currently viewed item 606 is added to the newly created gift list. Thereafter, the routine 700 terminates.

In one embodiment, once the new gift list is created and the item 606 is added, the new gift list is displayed, such as that illustrated in regard to FIG. 6C.

Figure 9:
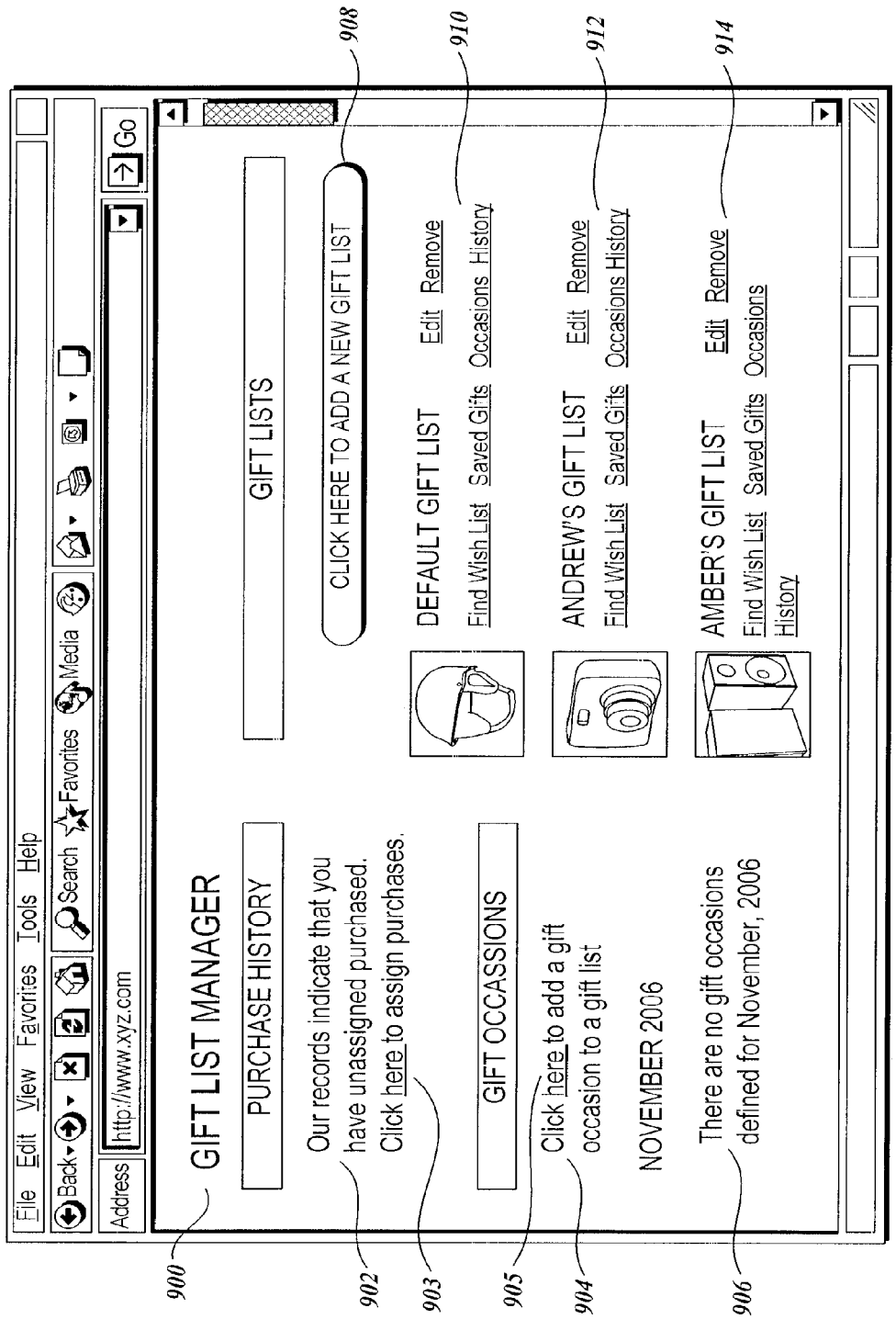
FIG. 9 is a pictorial diagram of an illustrative gift list manager for managing a user's gift lists as displayed by a browser.

According to aspects of the present invention, a user can manage his or her gift lists via a gift list manager. FIG. 9 is a pictorial diagram of an illustrative gift list manager 900 for managing a user's gift lists as displayed by a browser 920.

The illustrative gift list manager 900 includes an area 902 for associating purchased items with a gift list (or not purchased as a gift) and includes a link 903 to associate purchased items to gift lists. The illustrative gift list manager 900 also includes a gift occasion area 904 for adding gifting events/occasions to one or more gift lists. This gift occasion area 904 includes a link 905 that takes the user to a set of pages for creating gifting occasions for gift lists. Further, the gift occasion area 904 also includes a list of gifting occasions that are to occur within the next month, as indicated by arrow 906.

The illustrative gift list manager 900 also includes a control 908 for creating new gift lists as previously described (though without adding a particular item to the gift list). Additionally, each gift list created by the user is displayed, as indicated by gift lists 910-914, and controls are provided to edit profile information for that gift list, remove the gift list, locate a wish list published by the targeted user so that items can be imported from the wish list into the gift list, view gifts/items on the list, view events associated with the gift list, and view a purchase history of items related to this gift list.

Of course, the operations illustrated on this sample gift list manager should be viewed as illustrative operations, and should not be viewed as limiting upon the present invention. Additional and/or fewer operations may be provided without departing from the scope of the present invention.

Figure 10A:
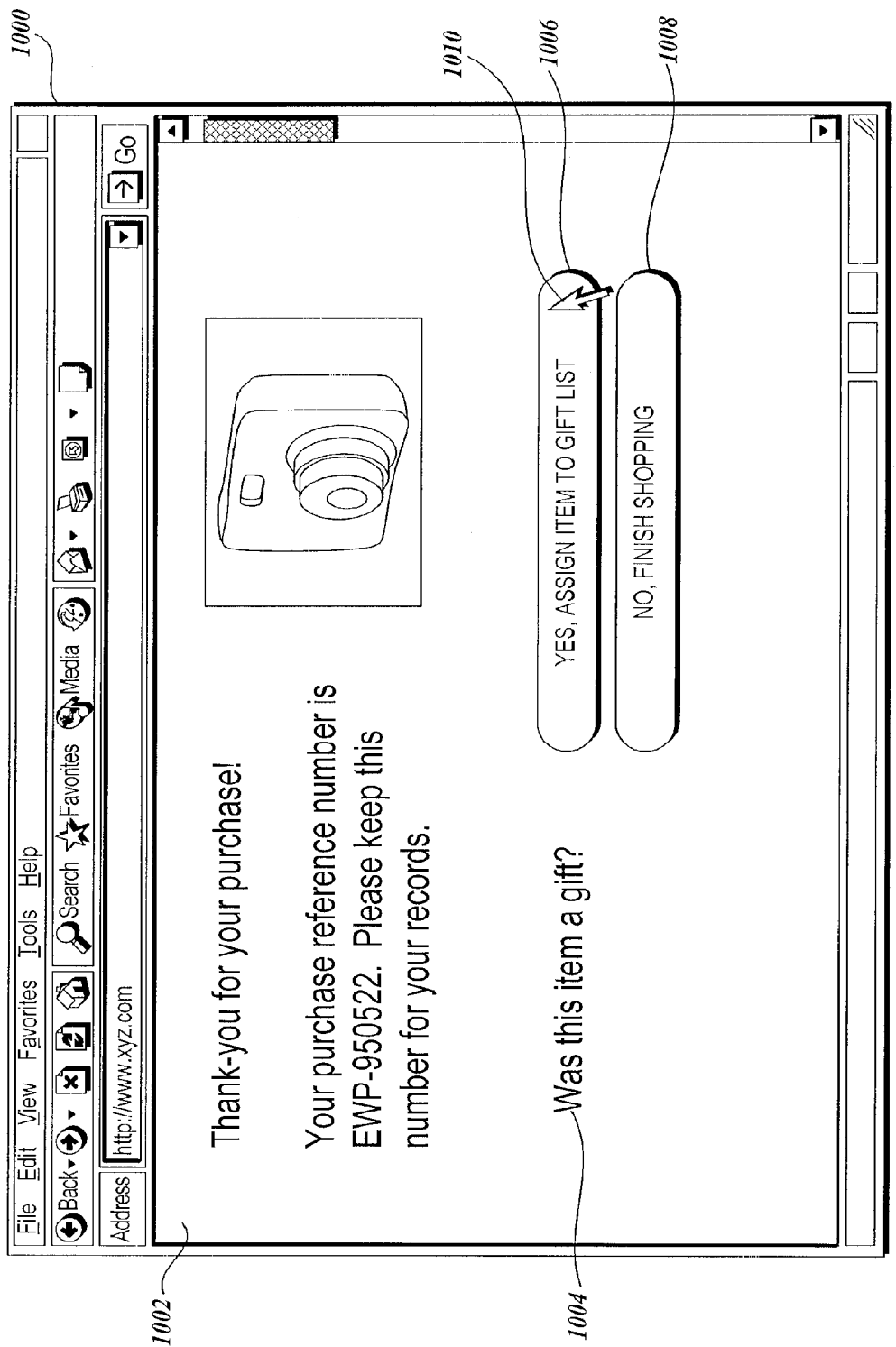
FIGS. 10A and 10B are pictorial diagrams of an illustrative browsing displaying a portion of a purchase process for associating a purchased item with a gift list.
Figure 10B:
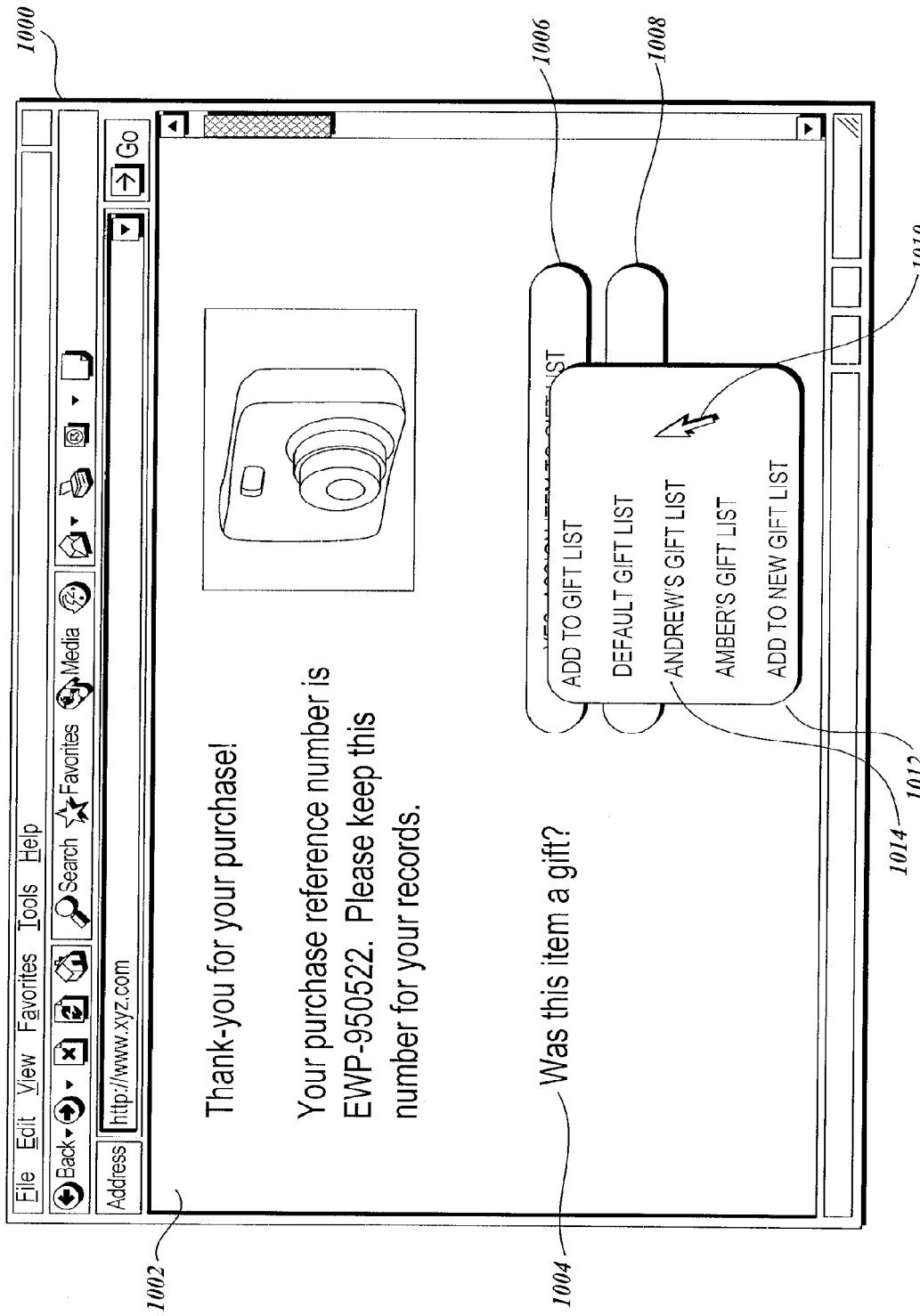

While the gift list manager permits a user to associate previously purchased items with one of the user's defined gift lists, in at least one embodiment, the gift list services are integrated such that, upon purchase of an item, a user may associate an item with a gift list. In other words, as part of the purchase transaction (irrespective of whether it is at the start or end of the purchase process) the user is prompted to associate a purchased item with a gift list. FIGS. 10A and 10B are pictorial diagrams of illustrative browser views showing how a user may be prompted to associate an item with a gift list. In particular, FIG. 10A illustrates a browser view 1000 showing a confirmation page 1002 as a result of purchasing an item. As part of this process, the integrated gift list service prompts 1004 the user if the purchased item was a gift. Additionally, the user is provided with controls to either associate the item with a gift list, via control 1006, or finish the purchase transaction 1008. In this example, the user may position the cursor 1010 over control 1006 to associate the item with a gift list.

FIG. 10B illustrates one way in which the control may react to the users activation: i.e., displaying a pop-up list 1012 of the user's gift lists and enabling the user to select one of the identified gift lists, such as the gift list represented by entry 1014, via the cursor 1010. Of course, this illustrates just one of many user-actionable controls and/or interfaces that may be used to associate a particular item with a gift list during the purchase process. Thus, the controls of FIGS. 10A and 10B should be viewed as illustrative only, and not construed as limiting upon the present invention.

With regard to assigning purchased items to a gift list, in at least one embodiment, if the item purchased was already associated with a gift list, and assignment process as described above in regard to FIGS. 10A and 10B would not be necessary.

While the above description has been made with regard to a gift list service integrated within a single network shopping service 110, it was illustrative only and should not be construed as limiting upon the present invention. In alternative embodiments, gift list services may be integrated within a plurality of network shopping services. For example, in a first embodiment, the plurality of network shopping services are cooperating with each other in regard to providing the user with gift list services, including the interfaces to create gift lists that are accessible from any of the cooperative network shopping services; adding items to a single gift list from any of the cooperative network shopping services; storing and maintaining the user's gift lists, and the like. In another embodiment, a plurality of network shopping services cooperate with a software component integrated with or installed in the user's browser that presents a user interface control, such as a tool bar or component-installed menu, through which the user can create, maintain, and add to the user's gift lists. In this embodiment, the user may designate a single network shopping service 110 as the host service where the gift lists are maintained, or maintain them locally on the user's computing device. Each cooperative network shopping service need only recognize and interact with the gift list software component installed in the user's browser, rather than cooperatively interacting with other network shopping services.

While illustrative embodiments have been illustrated and described, it will be appreciated that various changes can be made therein without departing from the spirit and scope of the invention.

What is claimed is:

1. A system for maintaining gift lists, the system comprising:
   an electronic data store configured to store gift lists; and
   one or more computing devices in communication with the electronic data store, the one or more computing devices configured to:
     detect that a user has selected an item offered for purchase via an electronic marketplace, while the user is browsing the electronic marketplace via a browser application;
     in response to detecting the selection of the item, providing display information including a list of persons for whom gift lists are stored in the electronic data store;
     prompt the user to select, via the browser application, that the item offered for purchase via the electronic marketplace is a potential gift for a person referenced in the list of persons for whom gift lists are stored in the electronic data store;
     detect that the user has indicated that the potential gift is for the selected person; and
     add a reference to the selected item offered for purchase to a gift list associated with the selected person of the gift lists stored in the electronic data store, in response to detecting that the user has indicated that the potential gift is for the selected person.

2. The system of claim 1, wherein the one or more computing devices are further configured to enable the user to create an additional gift list in response to detecting that the user has selected the item offered for purchase by the network shopping service while browsing.

3. The system of claim 1, wherein the gift list associated with said person comprises information identifying a relationship between the user and said person.

4. The system of claim 1, wherein the one or more computing devices are further configured to:
   associate a gift-giving occasion with the gift list associated with said person; and
   provide a notification to the user of the gift-giving occasion.

5. The system of claim 1, wherein the one or more computing devices are further configured to create the gift list associated with said person and store the gift list associated with said person in the electronic data store.

6. The system of claim 1, wherein the one or more computing devices are further configured to obtain, via the browser application, information related to said person and store the information related to said person in the gift list associated with said person stored in the electronic data store.

7. A computer-implemented method for maintaining a gift list, the method comprising:
   under control of one or more computer devices configured with specific computer-executable instructions,
     determining that a user has selected, via a browser, an item available for purchase from a network shopping service as a potential gift, while the user is browsing the network shopping service;
     in response to determining that the user has selected the item available for purchase while browsing, prompting the user for information identifying that the item available for purchase is the potential gift for a person selected from a group of two or more persons, said prompting comprising causing display, via the browser, of information associated with gift lists of each person of the group of two or more persons in combination with information regarding the item available for purchase; and
     in response to receiving the information identifying that the item available for purchase is for said person, adding a reference to the item available for purchase to a gift list for said person stored in an electronic data store, the gift list for said person storing information identifying said person and the reference to the item available for purchase selected by the user as the potential gift for said person.

8. The computer-implemented method of claim 7, further comprising causing display of the information associated with the group of two or more persons, in response to determining that the user has selected the item available for purchase while browsing.

9. The computer-implemented method of claim 7, further comprising preventing said person from accessing the gift list for said person.

10. The computer-implemented method of claim 7, further comprising providing display information associated with a plurality of references to items stored in the gift list for said person.

11. The computer-implemented method of claim 7, further comprising associating a gift-giving occasion with the gift list for said person and storing information associated with the gift-giving occasion with the gift list in the electronic data store.

12. The computer-implemented method of claim 7, further comprising adding an additional reference to a different item available for purchase from a different network shopping service to the gift list for said person.

13. A system comprising:
   an electronic data store configured to store gift lists; and
   one or more computing devices in communication with the electronic data store, the one or more computing devices configured to:
     enable a user to select, via a browser, an item offered for purchase via an electronic marketplace, while the user is browsing the electronic marketplace;
     in response to the user selecting the item offered for purchase while browsing, provide display information associated with a group of persons for whom gift lists are stored in the electronic data store and prompt the user, via the browser, for information identifying a person from the group of persons for whom the item offered for purchase is a potential gift;
     receive, via the browser, information identifying said person for whom the item offered for purchase is the potential gift; and
     add a reference to the selected item offered for purchase to a gift list for said person in response to receiving the information identifying said person from the user, said gift list stored in the electronic data store and including information identifying said person.

14. The system of claim 13, wherein the one or more computing devices are further configured to enable the user to request display of information associated with references to items added to the gift list for said person stored in the electronic data store.

15. The system of claim 14, wherein the one or more computing devices are further configured to enable the user to request display of recommended items with the display of information associated with references to items added to the gift list for said person stored in the electronic data store.

16. The system of claim 14, wherein the one or more computing devices are further configured to enable the user to select an item to purchase from the display of information associated with references to items added to the gift list for said person stored in the electronic data store.

17. The system of claim 13, wherein the one or more computing devices are further configured to obtain profile information related to said person and store the obtained profile information in association with the gift list for said person in the electronic data store.

18. The system of claim 13, wherein the one or more computing devices are further configured to enable the user to create the gift list for said person, via the browser, by providing a gift list name and information about said person indicative of one or more of the following: a relationship between the user and said person, at least one personality trait of said person, or an event associated with said person.

19. The system of claim 13, wherein the one or more computing devices are further configured to cause display of an image associated with the item offered for purchase while prompting the user for information identifying the person from the group of persons for whom the item offered for purchase is the potential gift.

* * * * *